Dec. 22, 1953          E. HILL          2,663,330
AUTOMATIC INTERMITTENT FEED-AND-CUT CORDWOOD SAW
Filed Aug. 30, 1950          3 Sheets-Sheet 1
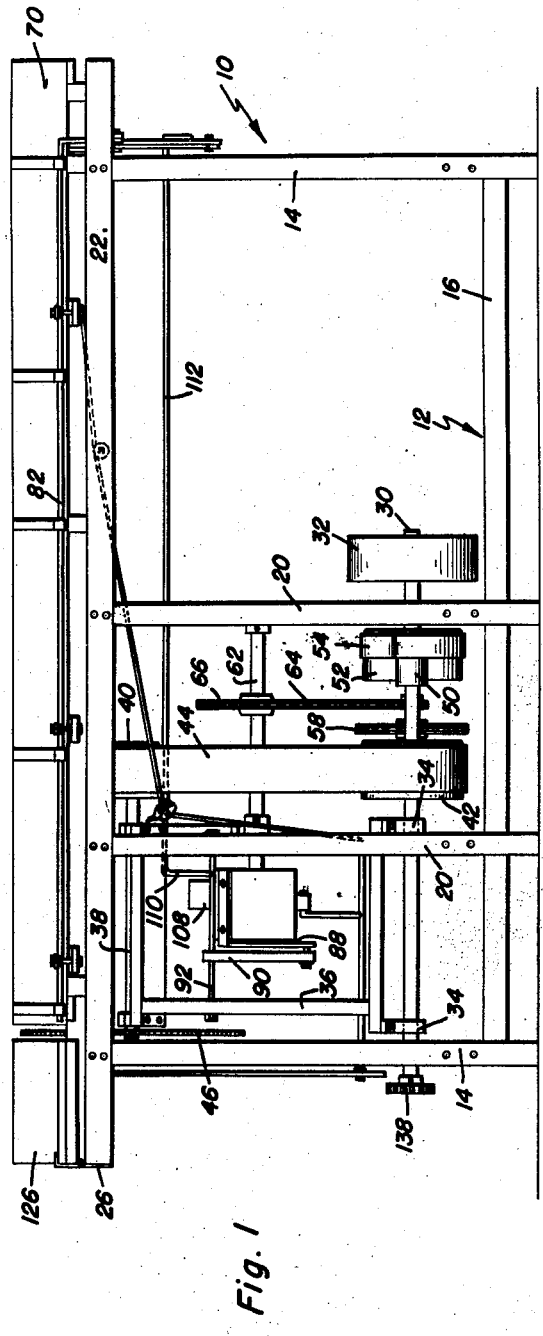
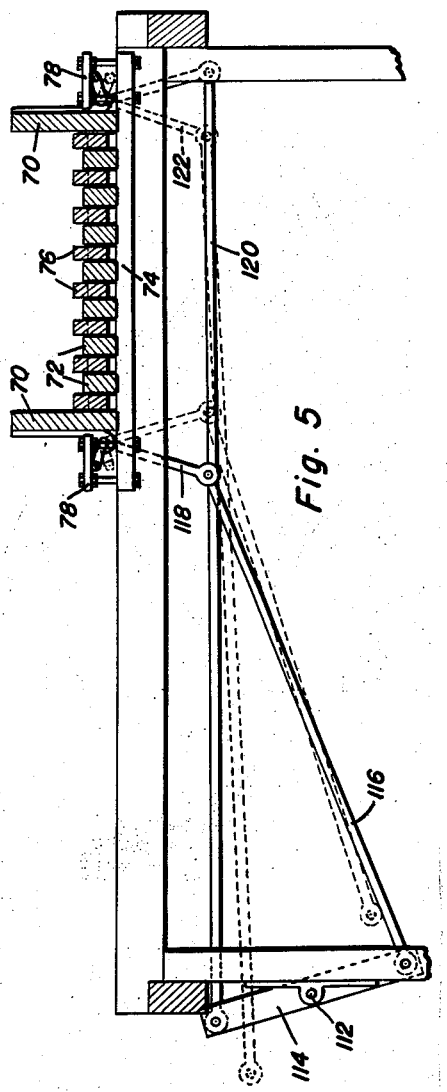
Inventor
Elvin Hill
By *Clarence A. O'Brien and Harvey B. Jacobson*
                                                   Attorneys Dec. 22, 1953          E. HILL          2,663,330
AUTOMATIC INTERMITTENT FEED-AND-CUT CORDWOOD SAW
Filed Aug. 30, 1950          3 Sheets-Sheet 2
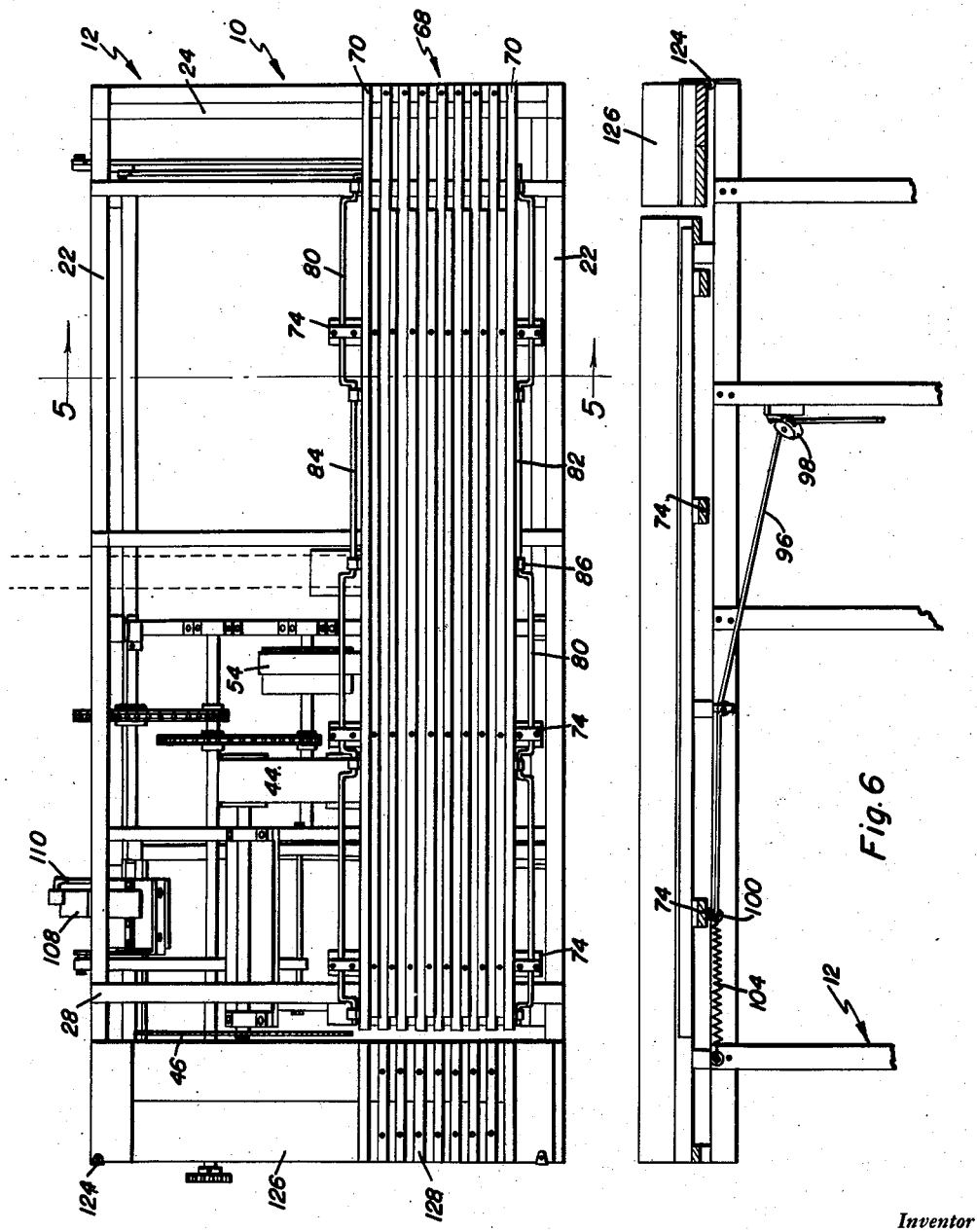
Inventor
Elvin Hill
By *Clarence A. O'Brien and Harvey B. Jacobson*
Attorneys

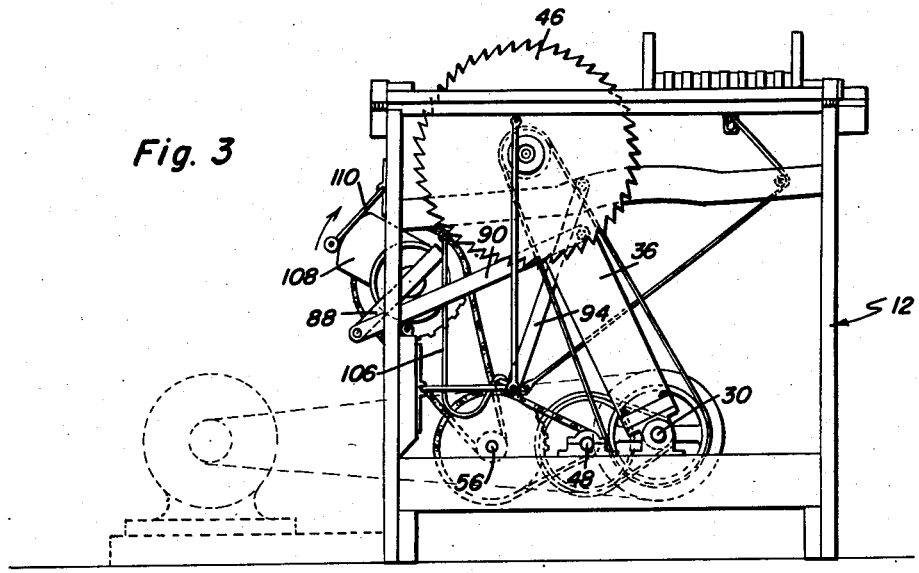
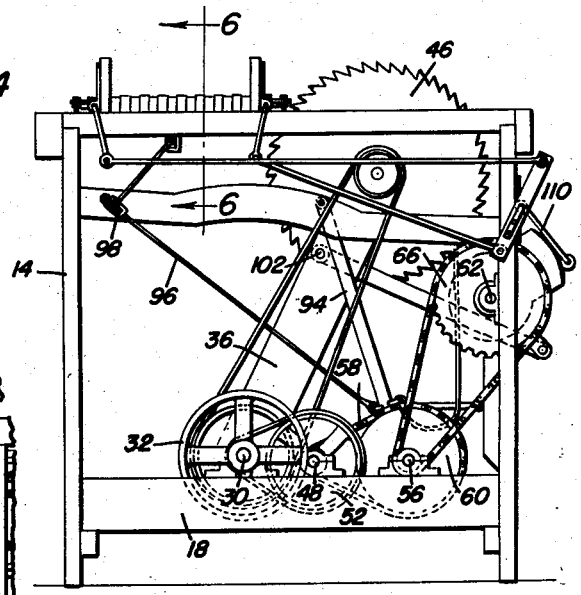
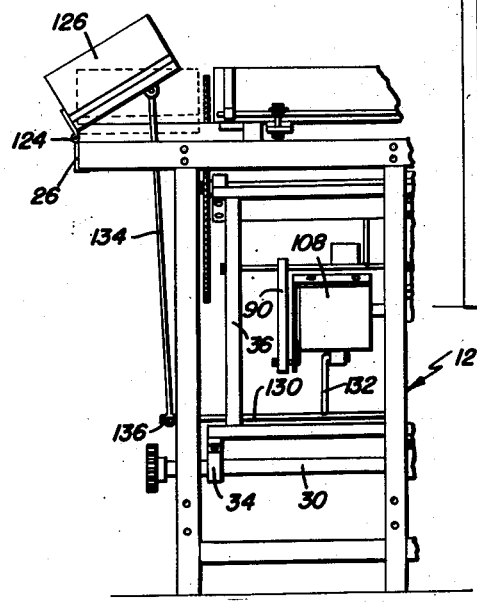
Inventor
Elvin Hill

Patented Dec. 22, 1953

2,663,330

UNITED STATES PATENT OFFICE 2,663,330

AUTOMATIC INTERMITTENT FEED-AND-CUT CORDWOOD SAW

Elvin Hill, Andersonville, Tenn., assignor of twenty per cent to J. Howard Collett, Maynardville, Tenn., and five per cent to Hal T. Spoden, Knoxville, Tenn.

Application August 30, 1950, Serial No. 182,228

6 Claims. (Cl. 143—46)

This invention relates to new and useful improvements in wood sawing machines, and more particularly pertains to a machine for feeding wood to a saw and sawing the same off in predetermined lengths.

The primary object of this invention is to periodically move a power-driven saw into and out of the travel path of lumber moving toward the saw, and to move the lumber toward the saw during the interval in which the saw has been moved out of the travel path of the work.

Another important object of this invention is to move the wood a predetermined distance toward the saw between each independent sawing operation, so that the wood will be sawn off into uniform lengths.

Another important object of this invention is to adjustably control the amount of wood that is fed or moved towards the saw between each independent sawing operation.

Another important object of this invention is to provide a machine of this character, the capacity of which is only limited by the rate at which wood is fed thereto.

Still another object closely allied with the preceding objects is to provide a machine of this character which will require the minimum amount of supervision and may be operated by a single workman who need not be particularly skilled to operate the machine.

Yet another important object of this invention is to provide a machine of this character which will be safe in operation, particularly in that the operator may work at a position considerably remote from the saw itself.

A meritorious feature of the present invention resides in the means for feeding wood to the saw intermittently.

Another important feature of the present invention resides in the means for feeding wood toward the saw in perfect synchronization with the means for urging the saw into and out of the travel path of the wood.

A final important feature to be specifically enumerated herein resides in the means for dumping wood that has been cut from the chute, and the means whereby the wood is dumped in synchronization with the feeding and the sawing operations of the machine.

These, together with various ancillary objects and features of the invention which will become apparent as the following description proceeds, are attained by the present invention, a preferred embodiment of which has been illustrated by way of example only in the accompanying drawings, wherein:

Figure 1 is a side elevational view of the invention;

Figure 2 is a top plan view of the machine shown in Figure 1;

Figure 3 is an end elevational view of the machine shown in Figures 1 and 2, in which certain concealed portions of the construction are shown in dotted outline;

Figure 4 is another end elevational view of the machine, this view being taken from the end opposite that shown in Figure 3 and is taken as if looking toward the left in Figure 1, this view also showing certain concealed portions of the invention in dotted outline;

Figure 5 (Sheet 1) is a vertical transverse sectional view taken upon the plane of the section line 5—5 of Figure 2;

Figure 6 (Sheet 2) is a vertical longitudinal sectional view taken upon the plane of the section line 6—6 of Figure 4; and Figure 7 (Sheet 3) is a fragmentary side elevational view of the discharge end of the machine, illustrating particularly the chute dump and showing the same in the discharging position.

Reference is now made more specifically to the accompanying drawings, wherein like numerals designate similar parts throughout the various views, and in which the cordwood sawing machine is designated generally at 10.

The machine 10 comprises a stand or frame 12 consisting of corner post legs 14 connected adjacent their lower ends by longitudinal braces 16 and horizontal braces 18. In addition, the frame 12 includes additional legs 20 that are connected by suitable cross braces. The upper ends of the legs 14 are connected by longitudinal side rails 22, which are in turn connected at their forward and rear ends, respectively, by transverse horizontal members 24 and 26. The side rails 22 are also connected adjacent their rear ends by a horizontal transverse member 28.

A driven shaft 30 is suitably mounted on the frame 12 for rotation about an axis extending longitudinally of the frame 12, which shaft 30 has provided thereon a large pulley 32 adapted to be driven by a prime mover and a belt as suggested in dotted outline in Figure 3. Swingably mounted by means of bearings 34 on the shaft 30 is a swing saw frame 36 which carries at its upper end a rotatable saw mandrel 38. The saw mandrel 38 and the shaft 30 have fixedly secured thereon pulleys 40 and 42 respectively over which pulleys a drive belt 44 is entrained, whereby the saw mandrel 38 is driven from the shaft 30 irrespective of the angular position of the swing saw frame 36. The end of the saw mandrel 38 remote from the pulley 40 is provided with a rotary saw 46.

As best shown in Figures 1, 2 and 4, a shaft 48 is disposed parallel to the shaft 30 and is suitably journaled on the frame 12 for rotation, such shaft 48 being driven by means of pulleys 50 and 52 fixed on the shafts 30 and 48, respectively, and having a driven belt 54 entrained thereover. Yet another shaft 56 is mounted for rotation on the frame 12 parallel to the shaft 30, the shaft 56 being driven by means of a small drive sprocket fixed on the shaft 48 that, through a drive chain 58, drives a large sprocket 60 fixed on the shaft 56. Still another shaft 62 is rotatably mounted on the frame 12 which is driven by means of a small drive sprocket fixed on the shaft 56 that drives a chain 64 entrained over a large sprocket 66 fixed on the shaft 62.

Supported on the members 24 and 26 of the frame 12 is a chute construction designated generally at 68 that includes side walls 70 (see Figure 5) and spaced, longitudinally extending ribs 72 between the side walls 70. Longitudinally spaced cradles 74 extend transversely beneath the ribs 72 and the side walls 70. The cradles 74 are connected by upstanding, spaced longitudinally extending ribs 76 that are interdigitated with the ribs 72. Brackets 78 are fixed to the opposite ends of the cradles 74 which rotatably receive the crank portions 80 (Figure 2) of shafts 82 and 84 rotatably mounted on the opposite faces of the side walls 70, as at 86, the arrangement being such that the cradles 74 are supported by the crank portions 80 of the shafts 82 and 84 in such a manner that the shafts 82 and 84 may be rotated to raise and lower the cradles 74 to selectively project the ribs 76 above the upper edges of the ribs 72. In addition, since the crank portions 80 are quite elongated, the cradles 74 may be moved longitudinally with respect to the chute construction 68 with the cradles in either their elevated or their lowered position. As thus far described, it will be evident that upon raising the cradles 74 and moving the same toward the saw objects disposed on the chute will be carried toward the saw and that the cradles 74 may be lowered and then moved from the saw without moving objects on the chute away from the saw.

Attention is now directed to Figures 1 and 3 and particularly to the means provided for swinging the frame 36 about the shaft 30 as a pivot to move the saw 46 to and fro across the discharge end of the chute construction 68. The shaft 62 has a crank 88 provided on its end adjacent the saw 46 to which crank 88 is connected one end of a link 90 having its other end pivotally connected to a cross-rod 92 of the swing saw frame 36, whereby rotation of the shaft 62 causes oscillatory movement of the swing saw frame 36.

Means responsive to movement of the saw 46 away from alignment with the chute construction 68 is provided for urging movement of the cradles 74 toward the saw 46. Such means are best shown in Figure 4 and include a lever 94 having its upper end pivotally secured to the frame 12 and having its lower end attached to a flexible pull cable 96 (Figure 6) that is entrained over a guide pulley 98 to have its free end fixedly secured to one of the cradles 74 as at 100. Swinging movement of the lever 94 to tension the cable 96 is brought about by a roller 102 (Figure 4) secured to the frame 36 that engages the lever 94 during oscillating movement of the frame 36. Since it is apparent that the cable 96 can only cause movement of the cradle 74 toward the saw, a coiled tension spring 104 (Figure 6) is connected between the frame 12 and one of the cradles 74 to urge movement of the cradle 74 away from the saw, it being noted that a flexible check line 106 (Figure 3) has one end secured to the lever 94 and the other fixedly secured to the frame 12 to limit movement of the cradles 74 from the saw 46. In this connection, it should be noted that the line 106 is adjustable in length simply by taking up the same at its connection to the lever 94 to limit the movement of the cradles 74 from the saw 46, whereby the feeding stroke of the cradles 74 may be adjustably controlled.

Means is provided to rotate the shafts 82 and 84 to elevate the cradles 74 and the ribs 76 during movement of the cradles 74 towards the saw through the action of the lever 94, such means including a cam 108 fixed on the shaft 62 adjacent the crank 88 which operatively engages a roller carried at the extremity of a crank 110 on one end of a rock shaft 112. As best shown in Figures 1 and 5, the end of the rock shaft 112 remote from the crank 110 has fixed thereto a rocker 114. One extremity of the rocker 114 is pivotally coupled to a link 116 that has at its other end pivotal connection to a crank 118 fixed at one end of the shaft 84, while in a similar manner the other end of the rocker 114 is connected by a link 120 to a crank 122 provided on the other shaft 82. Consideration of Figure 5 will make it readily apparent that rocking the shaft 112 in one direction will impart rotation to the shafts 82 and 84 to cause the elongated crank portions of the latter-mentioned shafts to raise, thereby raising the cradles 74, while rotation of the shaft 112 in the other direction will permit the elongated crank portions, and consequently the cradles 74, to lower. It will be understood that the relative position of the crank 88 and the cam 108 is such that when the saw 46 has been swung clear or is swinging clear of the end of the chute construction 68, the cradles 74 will be raised so that the ribs 76 will engage and support wood resting in the chute so that the motion of the cradles 74 initiated by the lever 94 will urge wood toward the saw 46. In a similar manner, the cradles 74 are lowered when the spring 104 acts to return the cradles 74 to their position remote from the saw 46.

Pivotally mounted upon the cross member 26 of the frame 12, as at 124, is a chute dump 126 which includes a portion 128 (Figure 2) substantially identical in cross-section with the chute construction 68 and in alignment therewith, being disposed on the side of the saw 46 opposite therefrom. As clearly shown in Figure 7, the chute dump 126 may be swung upwardly and rearwardly to discharge wood deposited thereon after a sawing operation. Means is provided for raising the chute dump 126 upon the completion of each sawing operation, and for a showing of such means attention is directed to Figures 1 and 7, wherein it is seen that a rock shaft 130 is suitably journaled in the frame 12, which shaft 130 is provided with a crank arm 132 carrying a roller in operative engagement with the cam 108, whereby the shaft 130 is rocked. Pivotally secured to the under side of the chute dump 126 is a link 134 which has its lower end pivotally coupled to a further crank 136 fixed on the shaft 130, whereby oscillation of the shaft 130 imparts pivotal movement to the chute dump 126, as will be readily understood.

It is believed that the operation of the machine will now be readily understood. Wood is loaded upon the chute construction 68 at the end of the machine remote from the saw 46 and rotation imparted to the shaft 30 through the pulley 32, whereby the crank 88 is driven to oscillate the swing frame 36 to carry the saw 46 to and fro across the discharge end of the chute. The oscillating movement of the swing saw frame is accompanied by a synchronized feeding of wood to the saw through the action of the cam 108 and the lever 96 acting upon the cradles 74. Synchronized with the feeding of the wood to the saw and the motion of the saw, the chute dump 126 is actuated to discharge wood that has been sawn from the machine. Since it may be desirable to provide a conveyor for moving sawn wood to a position remote from the machine 10, a spur gear 138 (Figure 1) is fixed to the shaft 56 at the end thereof adjacent the chute dump 126, whereby a conventional conveyor, not shown, may be disposed below the chute dump 126 and driven by the gear 138.

Since, from the foregoing, the construction and advantages of this cordwood saw are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. In a cordwood sawing machine, a base, a wood delivery chute mounted on said base and a power-driven saw, a saw frame, said saw frame being mounted for to and fro movement transverse to the chute, means for periodically urging movement of wood in the chute towards the saw comprising a carriage associated with the chute, said carriage being movable vertically to engage wood in the chute when in its elevated position, said carriage also being movable longitudinally of the chute, a shaft rotatably mounted on said base, means operatively connecting the shaft to the saw frame to move the saw, cam driven links operatively connecting the shaft to the carriage to elevate the latter during backward movement of the saw frame, a flexible member operatively connecting the saw frame and the carriage to move the carriage towards the saw while said carriage is in elevated position, a chute dump pivoted to the base adjacent said saw, said dump being pivoted about a horizontal axis parallel to the path of movement of the saw and crank means operatively connecting said shaft to the chute dump to move the latter about said axis.

2. In a cordwood sawing machine, a stand, a wood delivery chute mounted on said stand, a driven shaft mounted in said stand, a saw frame pivotally mounted on said shaft, a power driven saw mounted on said saw frame, a crank rotatably mounted in said stand, a link operatively connecting said crank to said saw frame, means for rotating said crank to periodically oscillate said saw frame to move said saw transversely of said chute, a cam rotatable with said crank, a shaft journaled in said stand, a crank arm on said shaft contacting said cam, a rocker arm mounted on said shaft, said chute including spaced longitudinal ribs in its bottom, a carriage including spaced ribs, said chute ribs and said carriage ribs being interdigitated, crank shafts rotatably mounted on each side of said chute, said carriage being slidably mounted on said crank shafts, link means connecting said rocker arm to said crank shafts whereby said cam periodically actuates said crank shafts to raise the ribs of said carriage above the ribs of said chute, a lever pivotally mounted adjacent said frame, a roller on said frame engaging said lever for driving said link in one direction, a flexible connection secured to said link and to said carriage to move said carriage toward the path of travel of said saw in response to movement of the saw out of register with said chute, resilient means for moving said carriage in the opposite direction during forward motion of said saw.

3. In a cordwood sawing machine, having a longitudinally extending base frame with side rails and transverse members, and a driven shaft, mounted for rotation about an axis extending longitudinally of the frame, a swing saw frame oscillatably mounted on said driven shaft, a saw mandrel mounted on said saw frame parallel to said driven shaft, a saw mounted on said mandrel, power driven means for periodically oscillating said saw frame, a chute mounted on said base frame, said chute including a plurality of spaced apart longitudinally extending ribs, a feed cradle mounted below said chute, said cradle including a plurality of longitudinally extending spaced apart ribs interdigitated with ribs of said chute, a crank mounted at each side of said chute, means interconnected with said saw frame for oscillating said cranks to raise or lower said cradle, said cradle being supported on said cranks, said cradle being longitudinally slidable on said cranks, biasing means urging said cradle to a position away from said saw, a cable secured to said cradle, means responsive to movement of said saw away from said chute for tensioning said cable to move said cradle in opposition to said biasing means.

4. A cordwood sawing machine comprising a base frame, a wood delivery chute mounted on said base frame and extending longitudinally thereof, a swinging saw frame pivoted on said base for to and fro movement transverse to said chute, a saw journaled on said saw frame, power driven crank means for oscillating said frame for transversely moving said saw into and out of alignment with the chute, said chute including spaced parallel side walls and spaced longitudinal ribs forming a bottom in said chute, a carriage longitudinally movable in said chute, said carriage including spaced longitudinal ribs interdigitated with the ribs of said chute, and transverse cradle members extending beneath the sides and ribs of said chute, rotatable crank shafts journaled on the base parallel to the chute, said shafts including elongated crank portions, said cradle members being slidably mounted in said crank portions, a linkage operatively connected between said crank shafts and said power driven crank means for vertically moving said carriage to project the ribs of said carriage above the ribs of the chute when said saw is out of alignment with said chute, a cable operatively connected to said carriage and said crank means for urging said carriage toward the path of movement of said saw when said carriage ribs are above the ribs of the chute, and resilient means for urging said carriage away from the path of movement of the saw when said carriage ribs are below the ribs of the chute.

5. The combination according to claim 4 wherein said linkage includes a rock shaft mounted on said frame, a further shaft journaled on said base, a cam fixed on said further shaft, and a cam follower fixed on said rock shaft and engaging said cam.

6. The combination according to claim 4 wherein the operative connection between said cable and said crank means includes a lever having its upper end pivotally secured to the base frame, said cable being attached adjacent the lower end of said lever, and a roller secured on said swinging frame, said roller engaging said lever intermediate the ends thereof.

ELVIN HILL.

References Cited in the file of this patent

UNITED STATES PATENTS

| Number | Name | Date |
|---|---|---|
| 13,351 | Field | July 31, 1855 |
| 189,628 | Kautz | Apr. 17, 1877 |
| 685,812 | Bartholomew | Nov. 5, 1901 |
| 764,717 | Foshee | July 12, 1904 |
| 813,908 | Miller | Feb. 27, 1906 |
| 990,829 | Bell | May 2, 1911 |
| 1,262,943 | Gustafson | Apr. 16, 1918 |
| 2,005,522 | Holm | June 18, 1935 |
| 2,480,536 | Andrus | Aug. 30, 1949 |
| 2,497,488 | Cashwell | Feb. 14, 1950 |
| 2,540,004 | McFall | Jan. 30, 1951 |

FOREIGN PATENTS

| Number | Country | Date |
|---|---|---|
| 539,365 | Germany | Nov. 27, 1931 |